United States Patent
Lu et al.

(10) Patent No.: US 8,786,267 B2
(45) Date of Patent: Jul. 22, 2014

(54) REAL TIME ADJUSTABLE ZERO CURRENT DETECTION FOR A SWITCHING REGULATOR

(75) Inventors: Shao-Hung Lu, Taoyuan (TW); Isaac Y. Chen, Jubei (TW); An-Tung Chen, Pingjen (TW)

(73) Assignee: Richtek Technology Corp., Hsinchu (TW)

(*) Notice: Subject to any disclaimer, the term of this patent is extended or adjusted under 35 U.S.C. 154(b) by 568 days.

(21) Appl. No.: 13/093,205

(22) Filed: Apr. 25, 2011

(65) Prior Publication Data
US 2011/0267015 A1    Nov. 3, 2011

(30) Foreign Application Priority Data
Apr. 28, 2010  (TW) .............................. 99113527 A

(51) Int. Cl.
*G05F 1/00*    (2006.01)
(52) U.S. Cl.
USPC ............ 323/284; 323/271; 323/283; 323/285

(58) Field of Classification Search
CPC .............................. G05F 1/10; H02M 3/1588
USPC .................. 323/222, 225, 268, 271, 282–285
See application file for complete search history.

(56) References Cited

U.S. PATENT DOCUMENTS

| | | | |
|---|---|---|---|
| 6,864,645 B2 * | 3/2005 | Sun et al. ...................... | 315/308 |
| 8,421,425 B1 * | 4/2013 | Wu et al. ...................... | 323/223 |
| 2009/0218998 A1 * | 9/2009 | Huang et al. .................. | 323/282 |
| 2011/0148377 A1 * | 6/2011 | Schiff et al. ................... | 323/283 |
| 2011/0204860 A1 * | 8/2011 | Thiele et al. .................. | 323/271 |

* cited by examiner

*Primary Examiner* — Matthew Nguyen
(74) *Attorney, Agent, or Firm* — Muncy, Geissler, Olds & Lowe, P.C.

(57) ABSTRACT

A feedback loop is used to optimize a zero current threshold for a switching regulator. After the low side power switch of the switching regulator turns off, the switching node state is monitored to adjust the zero current threshold in a real time and thus the low-side power switch is prevented from turning off too early or too late. Thereby the efficiency in green mode is optimized.

12 Claims, 10 Drawing Sheets

REAL TIME ADJUSTABLE ZERO CURRENT DETECTION FOR A SWITCHING REGULATOR

FIELD OF THE INVENTION

The present invention is related generally to switching regulators and, more particularly, to zero current detection for switching regulators.

BACKGROUND OF THE INVENTION

In green mode, for example, pulse skipping mode, diode emulated mode, etc, a switching regulator will detect zero current for disabling the low-side power switch to prevent from reverse inductor current that may cause extra efficiency loss. Traditionally, the zero current detection is implemented by comparing the voltage of the switching node with some threshold such as ground potential, for example, disclosed by U.S. Pat. No. 7,327,127. However, the threshold for identifying a zero current is fixed in the circuit design and thus, when some component has different characteristics, for example, the comparator offset and delay time, the resistance of the high-side or low-side power switch, and the noise effect at the switching node, the low-side power switch may be turned off too early or too late, and consequently it can't precise to optimize the efficiency in green mode.

SUMMARY OF THE INVENTION

An objective of the present invention is to provide a real time adjustable zero current detector and detection method for a switching regulator.

According to the present invention, a real time adjustable zero current detector for a switching regulator uses a feedback loop to monitor the switching node state after a low-side power switch turns off to optimize a zero current threshold, and a comparator to compare the voltage of the switching node with the zero current threshold to trigger a zero current signal.

According to the present invention, a real time adjustable zero current detection method for a switching regulator monitors the switching node state after a low-side power switch turns off to optimize a zero current threshold, and compares the voltage of the switching node with the zero current threshold to trigger a zero current signal.

By monitoring the switching node state to adjust the zero current threshold in a real time, the low-side power switch is prevented from turning off too early or too late, thereby optimizing the efficiency in green mode.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
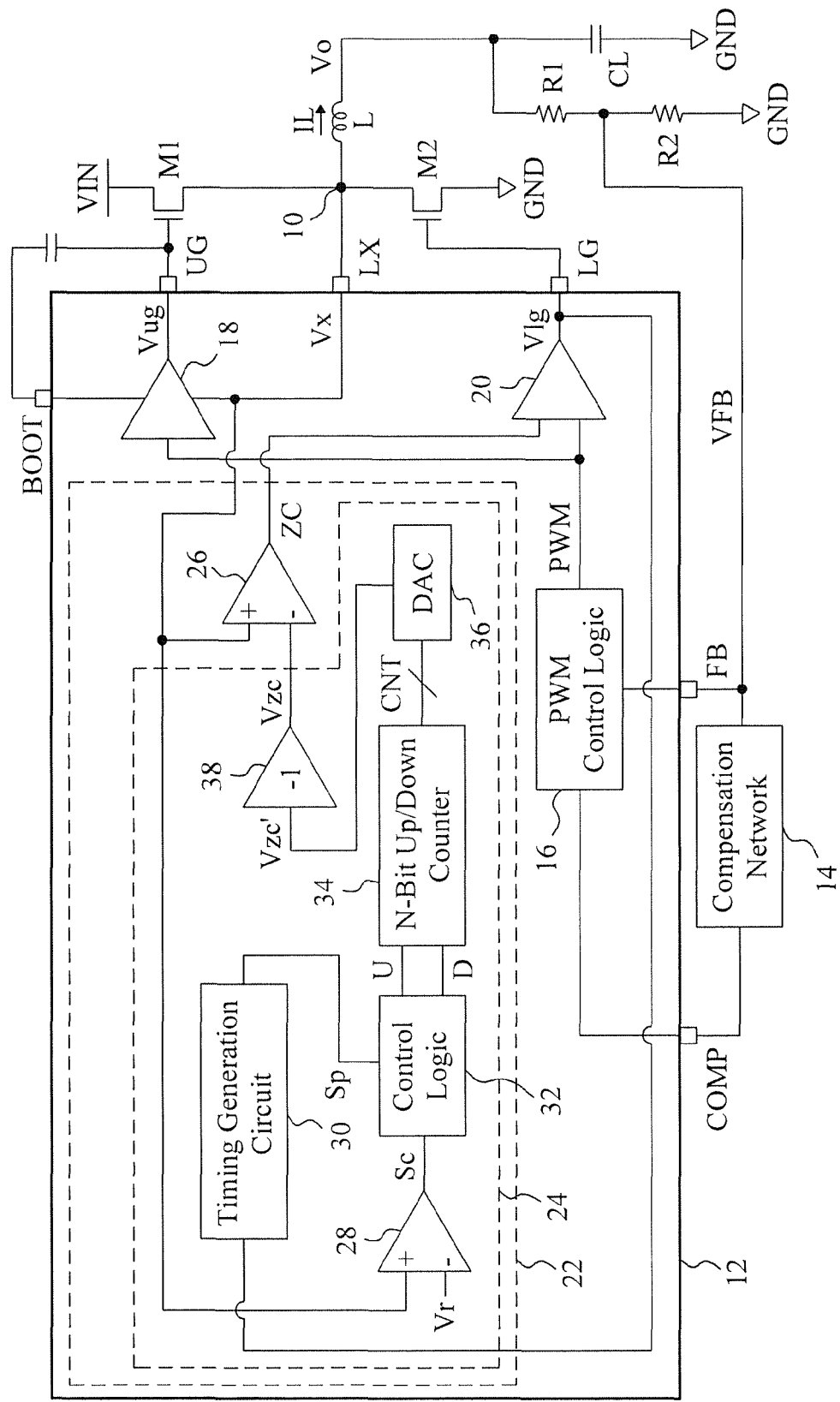
FIG. 1 is a circuit diagram of a first embodiment according to the present invention.

FIG. 1 is a circuit diagram of a first embodiment according to the present invention, in which a switching regulator includes a high-side power switch M1 connected to a low-side power switch M2 through a switching node 10, a controller chip 12 to provide control signals Vug and Vlg to switch the high-side power switch M1 and the low-side power switch M2 to generate an inductor current IL to charge a capacitor CL to thereby generate an output voltage Vo, divider resistors R1 and R2 to divide the output voltage Vo to generate a feedback signal VFB for the controller chip 12, and a compensation network 14 to compensate the feedback signal VFB. In the controller chip 12, a pulse width modulation (PWM) control logic 16 provides a pulse width modulation signal PWM for drivers 18 and 20 to generate the control signals Vug and Vlg, and a zero current detector 22 includes a feedback loop 24 and a comparator 26 for identifying a zero current. The feedback loop 24 monitors the switching node state after the low-side power switch M2 turns off to optimize a zero current threshold Vzc, and the comparator 26 compares the voltage Vx of the switching node 10 with the zero current threshold Vzc to trigger a zero current signal ZC for the driver 20 to disable the low-side power switch M2. In the feedback loop 24, a comparator 28 compare the voltage Vx with a reference voltage Vr to generate a comparison signal Sc, a timing generation circuit 30 detects the control signal Vlg to trigger a timing signal Sp when the low-side power switch M2 turns off, for a control logic 32 to sample the comparison signal Sc to determine an up signal U and a down signal D, an N-bit up/down counter 34 increases or decreases a count value CNT depending on the up signal U and the down signal D, a digital-to-analog converter (DAC) 36 converts the count value CNT into an analog voltage Vzc', and a buffer 38 generates the zero current threshold Vzc from the analog voltage Vzc'.

Figure 2:
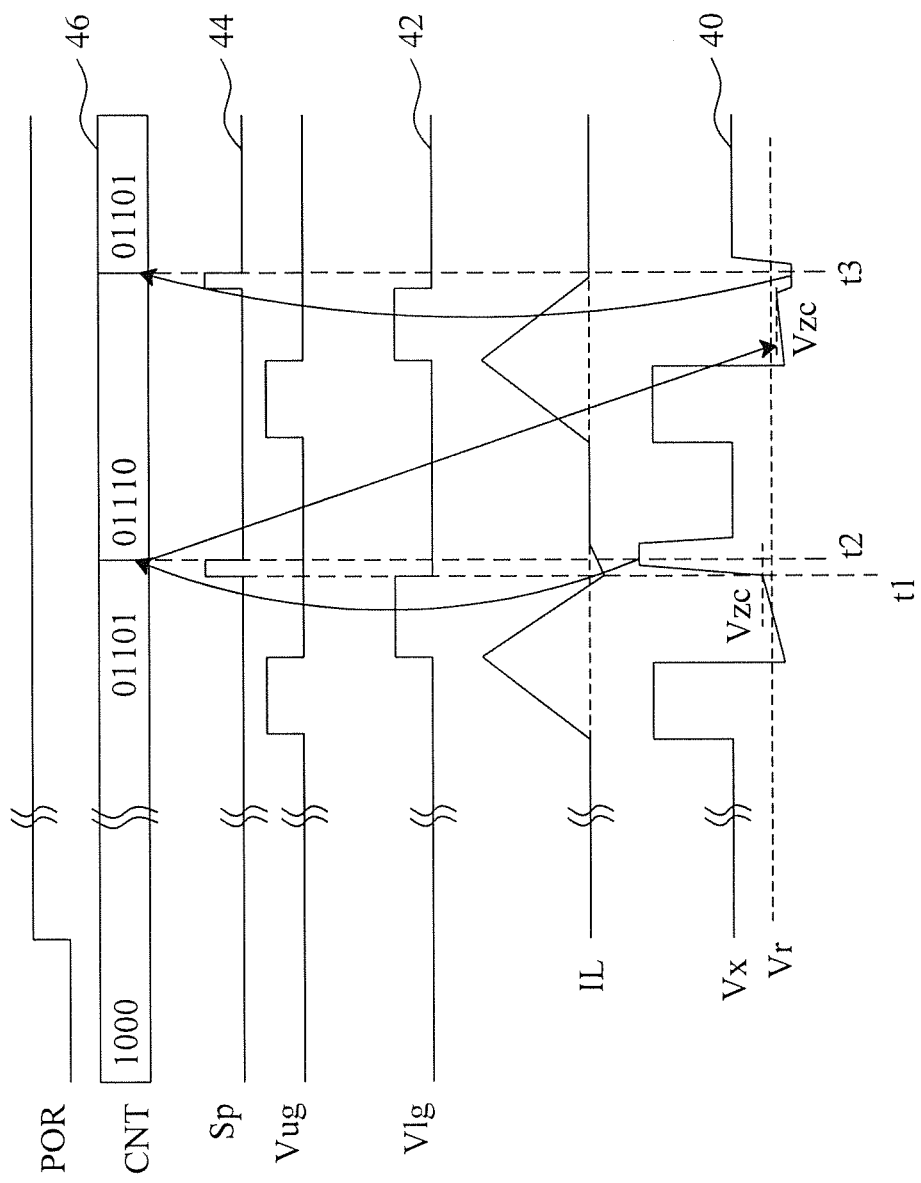
FIG. 2 is a waveform diagram of the switching regulator shown in FIG. 1.

FIG. 2 is a waveform diagram of the switching regulator shown in FIG. 1. Referring to FIG. 1 and FIG. 2, as shown by waveform 40 at time t1, when the voltage Vx increases to the zero current threshold Vzc, the control signal Vlg turns to low, as shown by waveform 42, which will turn off the low-side power switch M2 and make the timing generation circuit 30 to trigger the timing signal Sp, as shown by waveform 44, to signal the control logic 32 to sample the comparison signal Sc at time t2. At this time t2, since the voltage Vx is higher than the reference voltage Vr, as shown by waveform 40, the sample value will be "1", leading the up signal U to high and the down signal D to low. As a result, the count value CNT increase to "01110" from "01101", as shown by a bar 46, and thereby decreases the zero current threshold Vzc. On the contrary, when the sample value is "0", as shown by time t3, the up signal U is low and the down signal D is high, resulting in the count value CNT decreasing to "01101" from "01110", thereby increasing the zero current threshold Vzc.

Figures 3A, 3B, 3C:
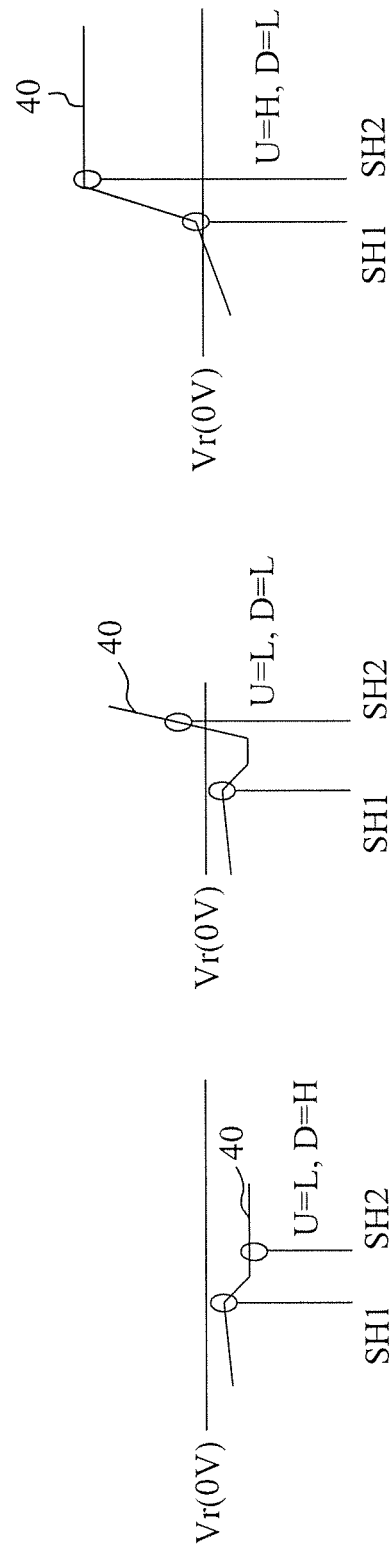
FIGS. 3A-3C illustrates an embodiment for identifying an up signal and a down signal with two sample values.

In the embodiment shown in FIG. 2, the control logic 32 determines the up signal U and the down signal D with only a sample. However, in other embodiments, more samples may be taken into consideration to determine the up signal U and the down signal D. For example, FIG. 3 shows the control logic 32 determines the up signal U and the down signal D with two sample values. In FIG. 3A, the values of the voltage Vx at two sampling time points SH1 and SH2 are both lower than the reference voltage Vr, so the control logic 32 obtains the sampled result of "00", which makes the up signal U and the down signal D both at high, thereby increasing the zero current threshold Vzc. In FIG. 3B, the value of the voltage Vx at the first sampling time SH1 is lower than the reference voltage Vr, while the value of the voltage Vx at the second sampling time SH2 is higher than the reference voltage Vr, so the control logic 32 obtains the sampled result of "01", which makes both the up signal U and the down signal D at low, thereby keeping the zero current threshold Vzc unchanged. In FIG. 3C, the values of the voltage Vx at two sampling time points SH1 and SH2 are both higher than the reference voltage Vr, so the control logic 32 obtains the sampled result of "11", which makes the up signal U at high and the down signal D at low, thereby decreasing the zero current threshold Vzc.

Figures 4A, 4B, 4C:
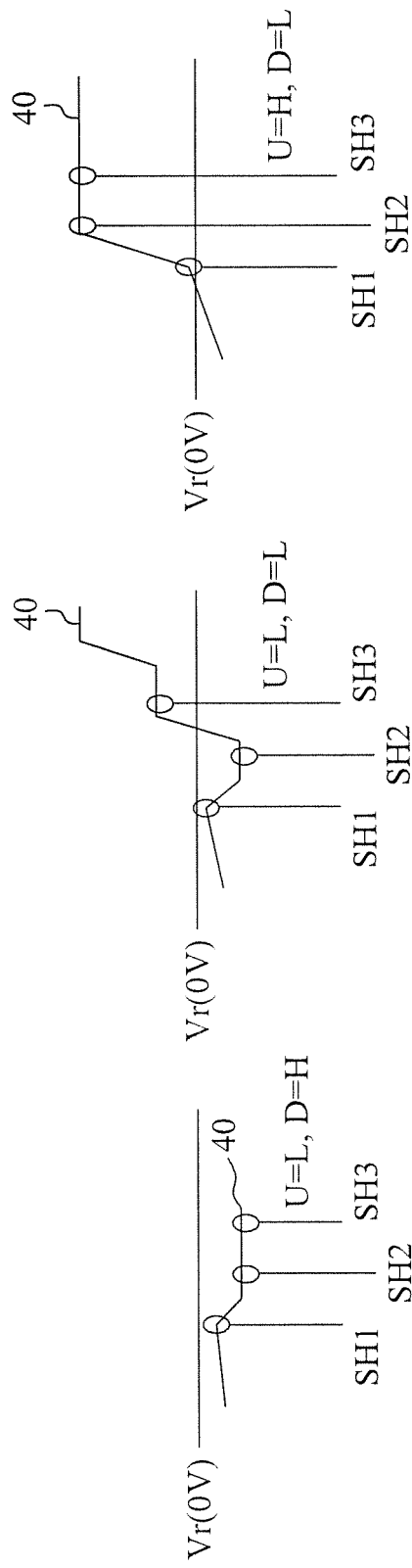
FIGS. 4A-4C illustrates an embodiment for identifying an up signal and a down signal with three sample values.

Alternatively, FIG. 4 illustrates another embodiment that the control logic 32 determines the up signal U and the down signal D with three sample values. In FIG. 4A, the values of the voltage Vx at three sampling time points SH1, SH2 and SH3 are all lower than the reference voltage Vr, so the control logic 32 obtains the sampled result of "000", thereby making the up signal U at low and the down signal D at high, which will increase the zero current threshold Vzc. In FIG. 4B, the values of the voltage Vx at the first and second sampling time points SH1 and SH2 are lower than the reference voltage Vr, and the voltage Vx at the third sampling time point SH3 is higher than the reference voltage Vr, so the control logic 32 obtains the sampled result of "001", thereby making the up signal U and down signal D both at low, which will remain the zero current threshold Vzc. In FIG. 4C, the values of the voltage Vx at three sampling time points SH1, SH2 and SH3 are all higher than the reference voltage Vr, so the control logic 32 obtains the sampled result of "111", thereby making the up signal U at high and the down signal D at low, which will decrease the zero current threshold Vzc.

Figure 5:
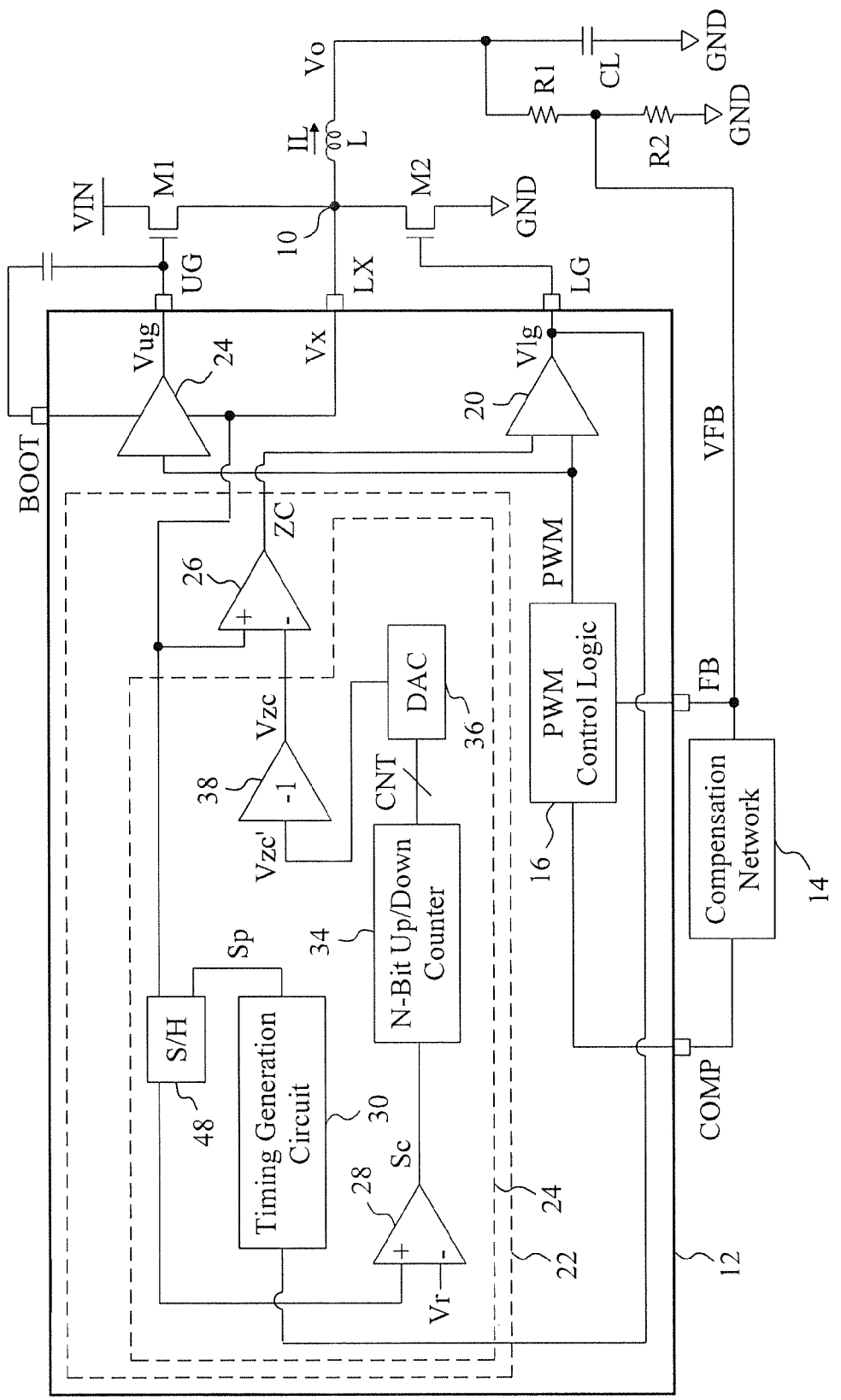
FIG. 5 is a circuit diagram of a second embodiment according to the present invention.

FIG. 5 is a circuit diagram of a second embodiment according to the present invention, which is similar to that shown in FIG. 1 except the circuit in the feedback loop 24. In FIG. 5, the timing generation circuit 30 detects the control signal Vlg to trigger the timing signal Sp when the low-side power switch M2 turns off, for a sample-and-hold circuit 48 to sample the voltage Vx to generate a sample signal LXF, a comparator 28 compares the sample signal LXF with the reference voltage Vr to generate the comparison signal Sc, and the N-bit up/down counter 34 increases or decreases the count value CNT depending on the comparison signal Sc. The rest part of this embodiment is the same as that of FIG. 1, in terms of both configuration and operation.

Figure 6:
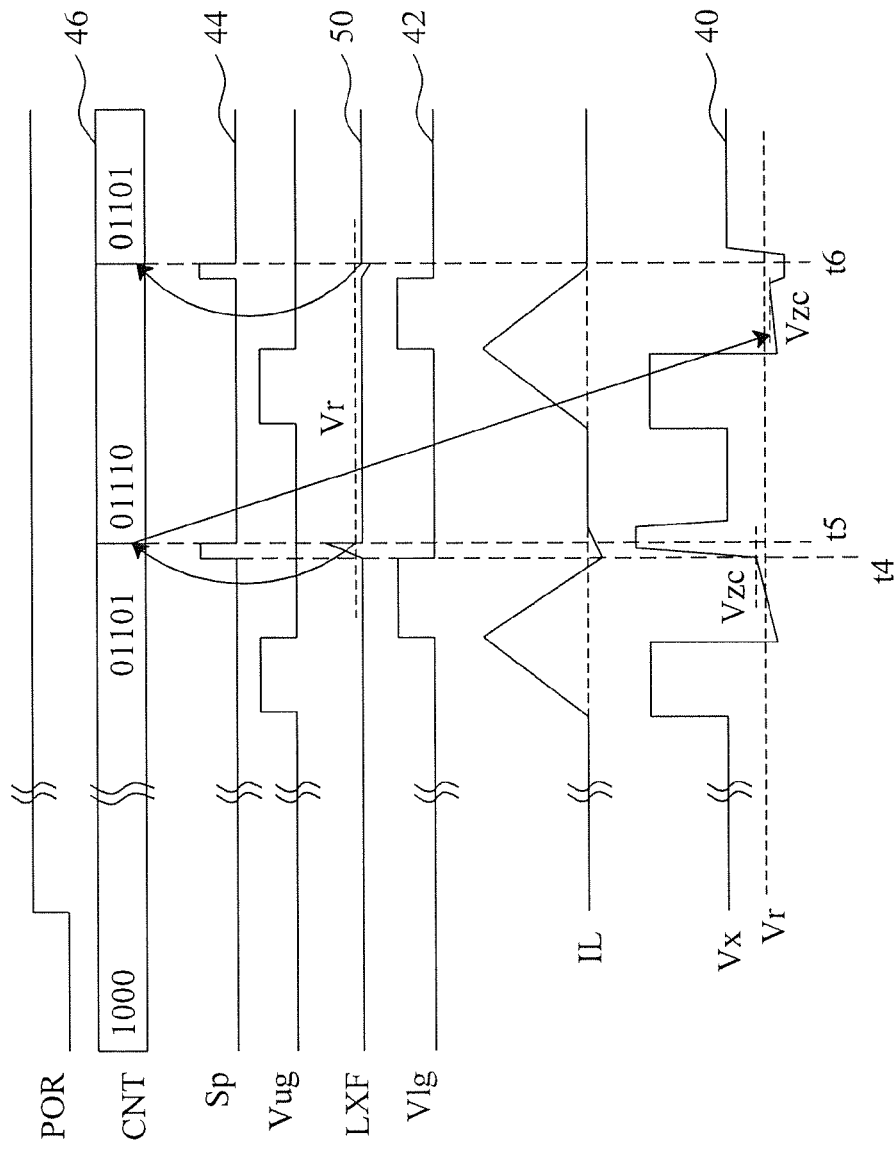
FIG. 6 is a waveform diagram of the switching regulator shown in FIG. 5.

FIG. 6 is a waveform diagram of the switching regulator shown in FIG. 5. Referring to FIG. 5 and FIG. 6, as shown by waveform 40 at time t4, when the voltage Vx increases to the zero current threshold Vzc, the control signal Vlg turns to low, as shown by waveform 42, and thus turns off the low-side power switch M2 and signal the timing generation circuit 30 to trigger the timing signal Sp, as shown by waveform 44. Consequently, the sample-and-hold circuit 48 samples the voltage Vx at time t5. At this time t5, since the voltage Vx is higher than the reference voltage Vr, as shown by waveform 40, the resultant sample signal LXF will be also higher than the reference voltage Vr, as shown by waveform 50, resulting in the output Sc of the comparator 28 at high. Therefore, the N-bit up/down counter 34 increases the count value CNT from "01101" to "01110", as shown by a bar 46, which will decrease the zero current threshold Vzc. On the contrary, when the sample signal LXF is lower than the reference voltage Vr, as shown at time t6, the output Sc of the comparator 28 will be low, and thus the N-bit up/down counter 34 will decrease the count value CNT from "01110" to "01101", thereby increasing the zero current threshold Vzc.

Figure 7:
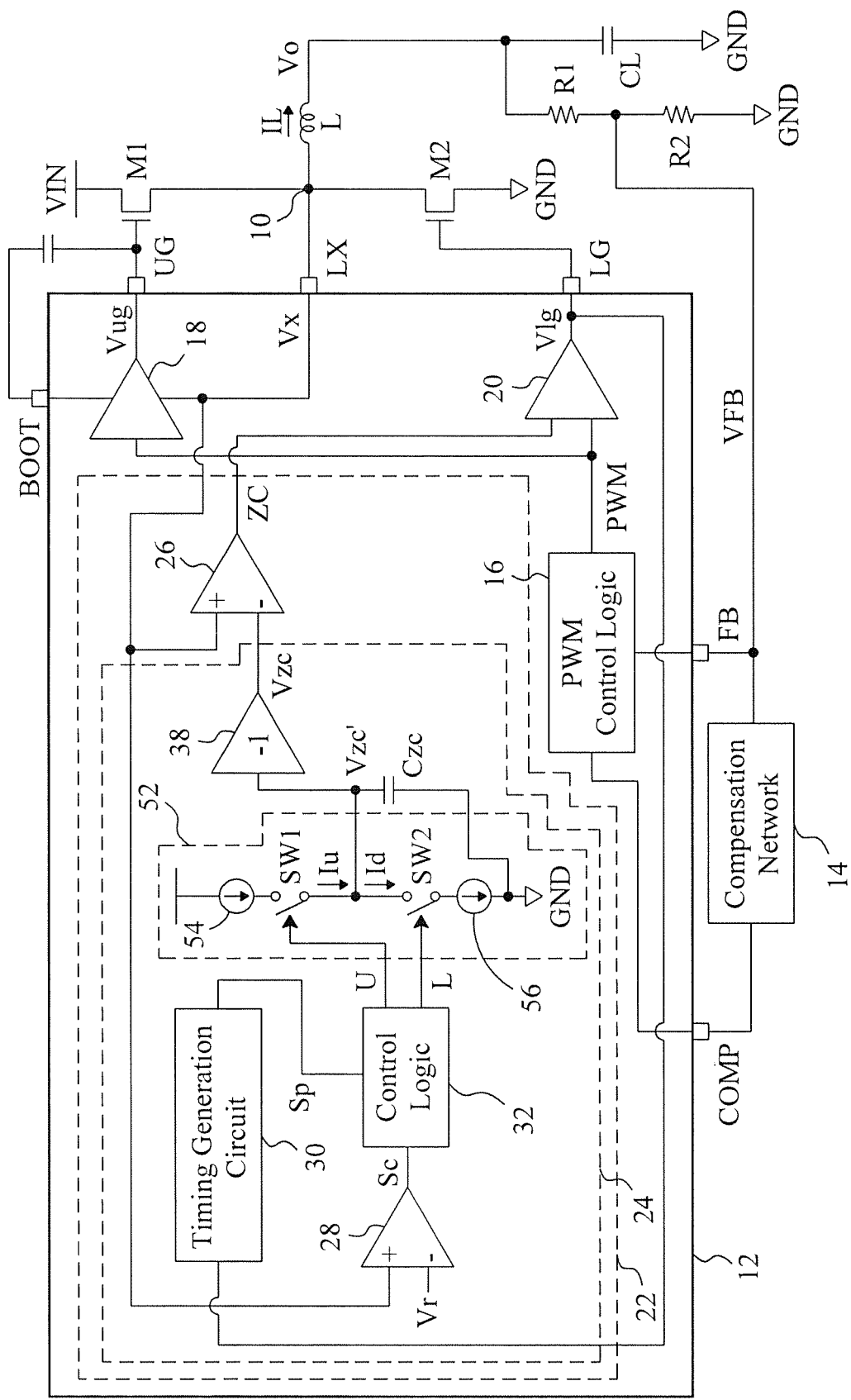
FIG. 7 is a circuit diagram of a third embodiment according to the present invention.

FIG. 7 is a circuit diagram of a third embodiment according to the present invention, which is modified by replacing the digital circuit that generates the analog voltage Vzc' of FIG. 1 by an analog circuit. In this embodiment, the up signal U and the down signal L provided by the control logic 32 control a charge/discharge circuit 52 to charge or discharge a capacitor Czc to generate the analog voltage Vzc'. In the charge/discharge circuit 52, a first current source 54 determines a charge current Iu, a charge switch SW1 is connected between the first current source 54 and the capacitor Czc, a second current source 56 determines a discharge current Id, and a discharge switch SW2 is connected between the capacitor Czc and the second current source 56. When the up signal U is high and the down signal L is low, the charge switch SW1 is on and the discharge switch SW2 is off, so that the charge current Iu charges the capacitor Czc, thereby increasing the analog voltage Vzc'. When the down signal L is high and the up signal U is low, the charge switch SW1 is off and the discharge switch SW2 is on, so that the discharge current Id discharges the capacitor Czc, thereby decreasing the analog voltage Vzc'.

Figure 8:
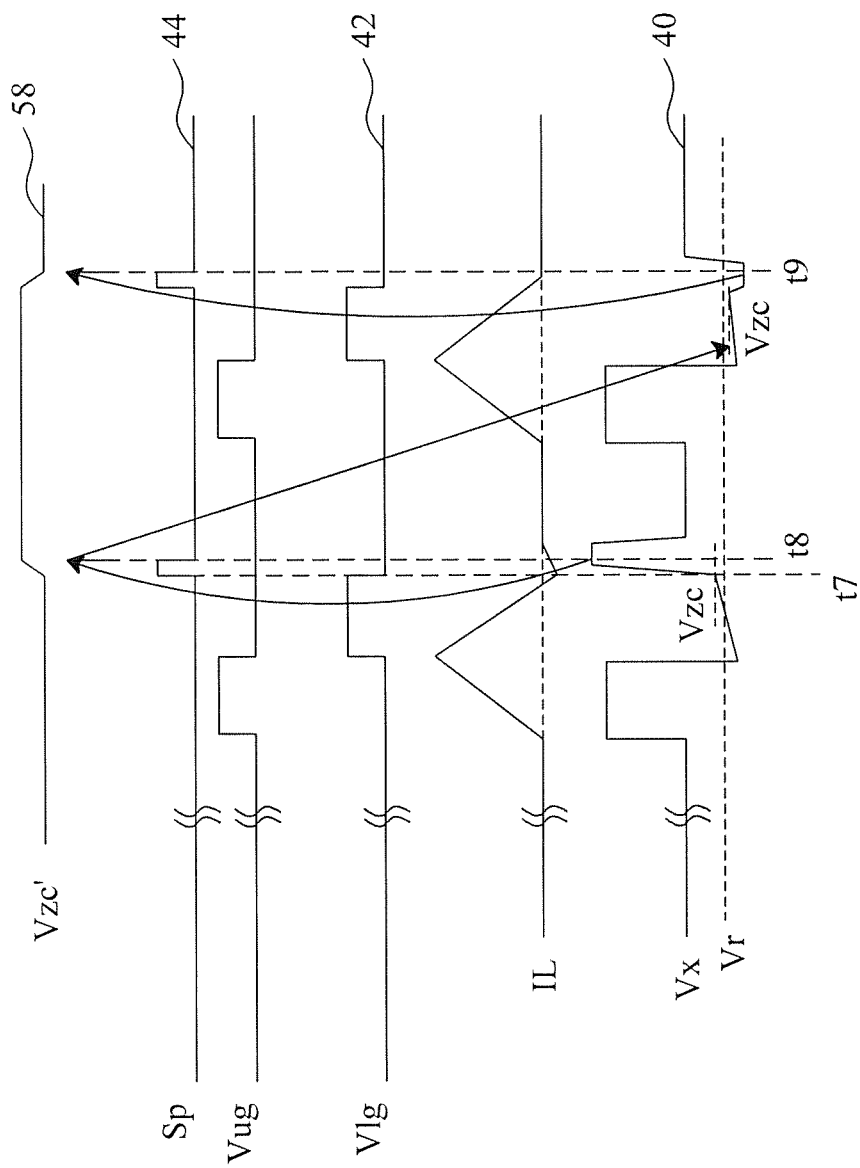
FIG. 8 is a waveform diagram of the switching regulator shown in FIG. 7.

FIG. 8 is a waveform diagram of the switching regulator shown in FIG. 7. Referring to FIG. 7 and FIG. 8, as shown by waveform 40 at time t7, when the voltage Vx increases to the zero current threshold Vzc, the control signal Vlg turns to low, as shown by waveform 42, so the low-side power switch M2 is turned off and the timing generation circuit 30 triggers the timing signal Sp, as shown by waveform 44. Consequently, the control logic 32 samples the comparison signal Sc at time t8. At the time of sampling, if the voltage Vx is higher than the reference voltage Vr, as shown by waveform 40, the sampled result will be "1", and the control logic 32 triggers the up signal U that has a constant pulse width, thereby turning on the charge switch SW1 to charge the capacitor Czc to increase the analog voltage Vzc', as shown by waveform 58, which will decrease the zero current threshold Vzc. On the contrary, if the voltage Vx is lower than the reference voltage Vr when the control logic 32 performs sampling, as shown by waveform 40 at time t9, the sampled result will be "0", and the control logic 32 triggers the down signal L that has a constant pulse width, thereby turning on the discharge switch SW2 to discharge the capacitor Czc to decrease the analog voltage Vzc', as shown by waveform 58, which will increase the zero current threshold Vzc. In this embodiment, the control logic 32 determines the up signal U and the down signal L with only a sample. However, in other embodiments, more samples may be taken into consideration to determine the up signal U and the down signal L, as illustrated in FIG. 3 and FIG. 4.

Figure 9:
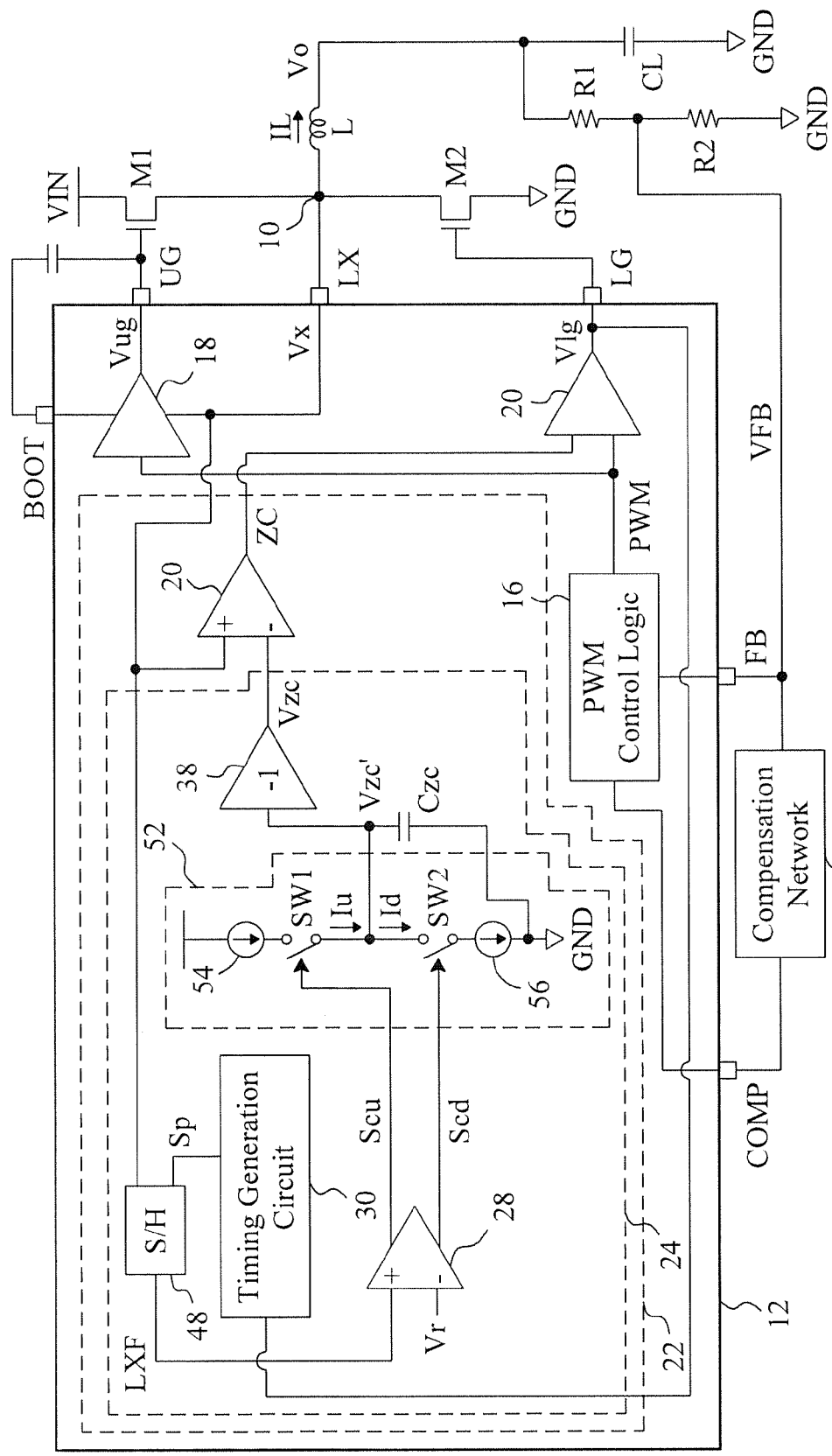
FIG. 9 is a circuit diagram of a fourth embodiment according to the present invention.

FIG. 9 is a circuit diagram of a fourth embodiment according to the present invention, which is modified by replacing the digital circuit that generates the analog voltage Vzc' of FIG. 5 by an analog circuit. In this embodiment, the comparator 28 compares the sample signal LXF with the reference voltage Vr to generate a pair of complementary first and second comparison signals Scu and Scd to control the charge/discharge circuit 52 to charge or discharge the capacitor Czc to generate the analog voltage Vzc'. When the first comparison signal Scu is high, the comparison signal Scd is low, so the charge switch SW1 is on and the discharge switch SW2 is off, resulting in the charge current Iu to charge the capacitor Czc to increase the analog voltage Vzc'. When the second comparison signal Scd is high, the first comparison signal Scu is low, so the charge switch SW1 is off and the discharge switch SW2 is on, resulting in the discharge current Id to discharge the capacitor Czc to decrease the analog voltage Vzc'.

Figure 10:
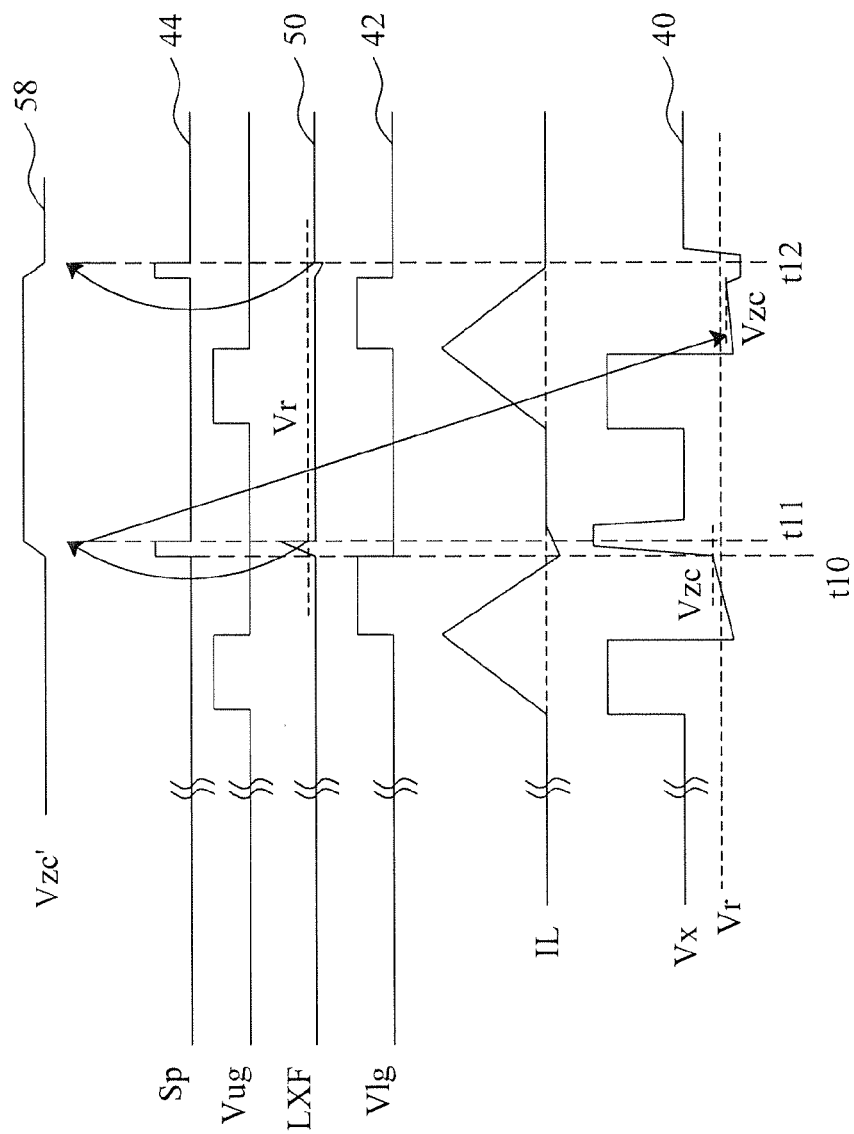
FIG. 10 is a waveform diagram of the switching regulator shown in FIG. 9.

FIG. 10 is a waveform diagram of the switching regulator shown in FIG. 9. Referring to FIG. 9 and FIG. 10, as shown by waveform 40 at time t10, when the voltage Vx increase to the zero current threshold Vzc, the control signal Vlg turns to low, as shown by waveform 42. Thus, the low-side power switch M2 is turned off and the timing generation circuit 30 triggers the timing signal Sp, as shown by waveform 44, so that the sample-and-hold circuit 48 samples the voltage Vx at time t11 and generates the sample signal LXF. If the sample signal LXF is higher than the reference voltage Vr, as shown by waveform 50 at time t11, the comparator 28 triggers the comparison signal Scu with a constant pulse width to turn on the charge switch SW1 to charge the capacitor Czc, causing the analog voltage Vzc' to increase, as shown by waveform 58, and in turn decreasing the zero current threshold Vzc. On the contrary, if the sample signal LXF is lower than the reference voltage Vr, as shown by waveform 50 at time t12, the comparator 28 triggers the comparison signal Scd with a constant pulse width to turn on the discharge switch SW2 to discharge the capacitor Czc, causing the analog voltage Vzc' to decrease, as shown by waveform 58, and in turn increasing the zero current threshold Vzc.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A real time adjustable zero current detector for a switching regulator including a high-side power switch connected to a low-side power switch through a switching node, the detector comprising:
    a feedback loop connected to the switching node, monitoring the switching node state after the low-side power switch turns off to optimize a zero current threshold; and
    a comparator connected to the feedback loop and the switching node, comparing a voltage of the switching node with the zero current threshold to trigger a zero current signal.

2. The detector of claim 1, wherein the feedback loop comprises:
    a second comparator connected to the switching node, comparing the voltage of the switching node with a reference voltage to generate a comparison signal;
    a timing generation circuit, operative to trigger a timing signal when the low-side power switch turns off;
    a control logic connected to the second comparator and the timing generation circuit, responsive to the timing signal to sample the comparison signal to determine an up signal and a down signal;
    an up/down counter connected to the control logic, responsive to the up and down signals to increase or decrease a count value;
    a digital-to-analog converter connected to the up/down counter, converting the count value into an analog voltage; and
    a buffer connected to the digital-to-analog converter, generating the zero current threshold from the analog voltage.

3. The detector of claim 1, wherein the feedback loop comprises:
    a timing generation circuit, operative to trigger a timing signal when the low-side power switch turns off;
    a sample-and-hold circuit connected to the switching node and the timing generation circuit, responsive to the timing signal to sample the voltage of the switching node to generate a sample signal;
    a second comparator connected to the sample-and-hold circuit, comparing the sample signal with a reference voltage to generate a comparison signal;
    an up/down counter connected to the second comparator, responsive to the comparison signal to increase or decrease a count value;
    a digital-to-analog converter connected to the up/down counter, converting the count value into an analog voltage; and
    a buffer connected to the digital-to-analog converter, generating the zero current threshold from the analog voltage.

4. The detector of claim 1, wherein the feedback loop comprises:
    a second comparator connected to the switching node, comparing the voltage of the switching node with a reference voltage to generate a comparison signal;
    a timing generation circuit, operative to trigger a timing signal when the low-side power switch turns off;
    a control logic connected to the second comparator and the timing generation circuit, responsive to the timing signal to sample the comparison signal to determine an up signal and a down signal;
    a capacitor;
    a charge/discharge circuit connected to the control logic and the capacitor, responsive to the up and down signals to charge or discharge the capacitor to generate an analog voltage; and
    a buffer connected to the capacitor, generating the zero current threshold from the analog voltage.

5. The detector of claim 4, wherein the charge/discharge circuit comprises:
    a first current source;
    a charge switch connected between the first current source and the capacitor, responsive to the up signal to turn on to connect the first current source to the capacitor;
    a second current source; and
    a discharge switch connected between the second current source and the capacitor, responsive to the down signal to turn on to connect the second current source to the capacitor.

6. The detector of claim 1, wherein the feedback loop comprises:
    a timing generation circuit, operative to trigger a timing signal when the low-side power switch turns off;
    a sample-and-hold circuit connected to the switching node and the timing generation circuit, responsive to the timing signal to sample the voltage of the switching node to generate a sample signal;
    a second comparator connected to the sample-and-hold circuit, comparing the sample signal with a reference voltage to generate a first comparison signal and a second comparison signal;
    a capacitor;
    a charge/discharge circuit connected to the second comparator and the capacitor, responsive to the first and second comparison signals to charge or discharge the capacitor to generate an analog voltage; and a buffer connected to the digital-to-analog converter, generating the zero current threshold from the analog voltage.

7. The detector of claim 6, wherein the charge/discharge circuit comprises:

a first current source;

a charge switch connected between the first current source and the capacitor, responsive to the first comparison signal to turn on to connect the first current source to the capacitor;

a second current source; and a discharge switch connected between the second current source and the capacitor, responsive to the second comparison signal to turn on to connect the second current source to the capacitor.

8. A real time adjustable zero current detection method for a switching regulator including a high-side power switch connected to a low-side power switch through a switching node, the detection method comprising the steps of:

(A) monitoring the switching node state after the low-side power switch turns off to optimize a zero current threshold; and (B) comparing a voltage of the switching node with the zero current threshold to trigger a zero current signal.

9. The detection method of claim 8, wherein the step A comprises the steps of:

comparing the voltage of the switching node with a reference voltage to generate a comparison signal;

triggering a timing signal when the low-side power switch turns off;

sampling the comparison signal responsive to the timing signal to determine an up signal and a down signal;

increasing or decreasing a count value responsive to the up and down signals;

converting the count value into an analog voltage; and generating the zero current threshold from the analog voltage.

10. The detection method of claim 8, wherein the step A comprises the steps of:

triggering a timing signal when the low-side power switch turns off;

sampling the voltage of the switching node responsive to the timing signal to generate a sample signal;

comparing the sample signal with a reference voltage to generate a comparison signal;

increasing or decreasing a count value responsive to the comparison signal;

converting the count value into an analog voltage; and generating the zero current threshold from the analog voltage.

11. The detection method of claim 8, wherein the step A comprises the steps of:

comparing the voltage of the switching node with a reference voltage to generate a comparison signal;

triggering a timing signal when the low-side power switch turns off;

sampling the comparison signal responsive to the timing signal to determine an up signal and a down signal;

charging or discharging a capacitor responsive to the up and down signals to generate an analog voltage; and generating the zero current threshold from the analog voltage.

12. The detection method of claim 8, wherein the step A comprises the steps of:

triggering a timing signal when the low-side power switch turns off;

sampling the voltage of the switching node responsive to the timing signal to generate a sample signal;

comparing the sample signal with a reference voltage to generate a first comparison signal and a second comparison signal;

charging or discharging a capacitor responsive to the first and second comparison signals to generate an analog voltage; and generating the zero current threshold from the analog voltage.

* * * * *